United States Patent [19]

Tsai et al.

[11] Patent Number: 5,595,631
[45] Date of Patent: Jan. 21, 1997

[54] METHOD OF PAPER SIZING USING MODIFIED CATIONIC STARCH

[75] Inventors: John J. Tsai, Belle Mead; Walter Maliczyszyn, Somerville, both of N.J.

[73] Assignee: National Starch and Chemical Investment Holding Corporation, Wilmington, Del.

[21] Appl. No.: 442,731

[22] Filed: May 17, 1995

[51] Int. Cl.⁶ .................................................. D21H 17/28
[52] U.S. Cl. ..................... 162/175; 162/158; 162/179
[58] Field of Search ..................... 162/158, 175, 162/179; 106/210, 211, 212, 213

[56] References Cited

U.S. PATENT DOCUMENTS

| | | | |
|---|---|---|---|
| Re. 29,960 | 4/1979 | Mazzarella et al. | 162/158 |
| 3,102,064 | 8/1963 | Wurzburg et al. | 162/158 |
| 4,214,948 | 7/1980 | Mazzarella et al. | 162/158 |
| 4,243,481 | 1/1981 | Dumas | 162/158 |
| 4,606,773 | 8/1986 | Novak | 106/213 |
| 4,687,519 | 8/1987 | Trzasko et al. | 106/211 |
| 4,721,655 | 1/1988 | Trzasko et al. | 428/530 |
| 4,747,910 | 5/1988 | Mazzarella et al. | 162/158 |
| 4,784,727 | 11/1988 | Schröer et al. | 162/158 |
| 4,832,792 | 5/1989 | Mazzarella et al. | 162/158 |
| 5,246,491 | 9/1993 | Takahashi et al. | 106/287 |

FOREIGN PATENT DOCUMENTS

| | | | |
|---|---|---|---|
| 0014520 | 8/1980 | European Pat. Off. | D21H 3/28 |
| 58-197397 | 11/1983 | Japan | D21H 3/28 |
| 60-88196 | 5/1985 | Japan | D21H 3/28 |

*Primary Examiner*—Donald E. Czaja
*Assistant Examiner*—Jose A. Fortuna
*Attorney, Agent, or Firm*—Eugene Zagarella, Jr.

[57] ABSTRACT

The invention involves the method of sizing paper products using a size composition comprising an aqueous dispersion of:

a) cyclic dicarboxylic acid anhydride containing hydrophobic substitution, and b) cationic, non-degraded starch which is further modified to a DS of from about 0.005 to 0.4 with either:

i) an ether group, R—O— where R is an hydroxyalkyl or alkyl of 1 to 4 carbon atoms, or alkenyl of 2 to 4 carbon atoms, or ii) an ester group,

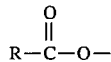

where R is an alkyl of 1 to 4 carbon atoms or alkenyl of 2 to 4 carbon atoms, and wherein;

the non-degraded, fully modified starch has a viscosity of at least 1,000 cPs at 30° C. in an 8% aqueous solution.

15 Claims, No Drawings

METHOD OF PAPER SIZING USING MODIFIED CATIONIC STARCH

BACKGROUND OF THE INVENTION

This invention relates to a paper size composition using a selected modified cationic starch and to a method of sizing paper and paperboard therewith. More particularly, this invention relates to a paper size composition comprising a mixture of a hydrophobic sizing agent and a selected modified cationic starch.

The use of sizing in paper is known to provide several beneficial attributes to the paper and the processing thereof including paper strength, retarding liquid penetration into the sheet and the quality, suitability and ease of printing on the paper.

Paper and paperboard are often sized with various hydrophobic materials including, for example, rosin, wax emulsions, mixtures of rosin waxes, ketene dimers, isocyanate derivatives, fatty acid complexes, fluorocarbons, certain styrene-maleic anhydride copolymers as well as the substituted cyclic dicarboxylic acid anhydrides, more particularly described hereinafter. These sizes are introduced during the actual paper making operation and, as such, require that the sizing compounds be uniformly dispersed throughout the fiber slurry in a small particle size. General practice therefore, has been to add the sizes in the form of an aqueous emulsion prepared with the aid of emulsifying agents such as cationic or ordinary starches, carboxymethyl cellulose, natural gums, gelatin, cationic polymers or polyvinyl alcohol, all of which act as protective colloids. The use of such emulsifying agents, with or without added surfactants, does, however, suffer from several inherent deficiencies in commercial practice. A primary deficiency concerns the necessity of utilizing relatively complex, expensive and heavy equipment capable of exerting high homogenizing shear and/or pressures, together with demanding procedures regarding emulsifying proportions and temperatures, etc., for producing a satisfactory stable emulsion of the particular size. Additionally, the use of many surfactants in conjunction with protective colloids is found to create operational problems in the paper making process such as severe foaming of the stock and/or loss in sizing.

With particular reference to the procedure of the prior art which utilizes substituted cyclic dicarboxylic acid anhydrides as sizing agents, it has been necessary in commercial practice to pre-emulsify with cationic starch and/or hydrocolloids using relatively demanding procedures with elevated temperatures to cook the starch or hydrocolloids and high shearing and/or high pressure homogenizing equipment. Unless these complicated procedures are carefully followed, difficulties such as deposition in the paper system, quality control problems and generally unsatisfactory performance are often encountered.

Many of these problems have been overcome by the teachings of U.S. Pat. No. 4,214,948 and U.S. Pat. No. Re 29,960 which disclose the use of a size mixture of specific sizing agents and polyoxyalkylene alkyl or alkyl-aryl ethers or their corresponding mono- or di-esters, which mixtures are easily emulsifiable with water in the absence of high shearing forces and under normal pressure.

Other useful size mixtures include the disclosure of a composition of a hydrophobic substituted cyclic dicarboxylic acid anhydride and an ethoxylated lanolin, as shown in U.S. Pat. No. 4,747,910, or ethoxylated castor oil shown in U.S. Pat. No. 4,832,792. Japanese Patent Disclosure Bulletin 60-88196, dated May 17, 1985 discloses dispersion stable sizing compositions comprising ketene dimers and a highly degraded hydroxyalkyl modified cationic starch. Another Japanese patent Disclosure Bulletin 58-197397, dated Nov. 17, 1983 discloses the preparation of sizing agents using selected cationic starch derivatives having a defined low inorganic ion concentration in combination with neutral sizing agents. Ether and ester modifications are provided along with significant molecular weight reduction by starch degradation in order to provide suitable emulsion stability. Another useful paper size composition and method is disclosed in U.S. Pat. No. 4,721,655 wherein a sizing emulsion comprising a hydrophobic sizing agent and a jet cooked dispersion of a long chain hydrophobic starch or gum derivative is shown.

Despite the contributions of the above noted patents and disclosures there remains a need in the art for sizing emulsions exhibiting improved emulsion quality, sizing performance and operability.

SUMMARY OF THE INVENTION

Now it has been found that a paper size composition comprising a hydrophobic sizing agent and a selected modified, cationic, non-degraded starch has improved emulsification and sizing performance. More particularly, this invention relates to a paper size composition comprising an aqueous dispersion of:

a) a cyclic dicarboxylic acid anhydride containing hydrophobic substitution, and b) a cationic, non-degraded starch which is further modified to a DS of from about 0.005 to 0.4 with either:
   i) an ether group, R—O—, where R is an hydroxyalkyl or alkyl of 1 to 4 carbon atoms or alkenyl of 2 to 4 carbon atoms, or
   ii) an ester group,

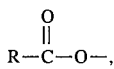

where R is an alkyl of 1 to 4 carbon atoms or alkenyl of 2 to 4 carbon atoms,
and wherein the non-degraded, fully modified starch has a viscosity of at least 1000 cPs at 30° C. in an 8% aqueous solution.

DETAILED DESCRIPTION OF THE INVENTION

The sizing compounds contemplated for use herein are the cyclic dicarboxylic acid anhydrides containing hydrophobic substitution. Those substituted cyclic dicarboxylic acid anhydrides most commonly employed as paper sizes are represented by the following formula:

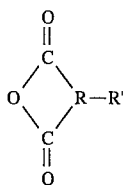

wherein R represents a dimethylene or trimethylene radical and wherein R' is a hydrophobic group containing more than 4 carbon atoms and particularly 5 to 30 carbon atoms which may be selected from the class consisting of alkyl, alkenyl, aralkyl, alkaryl, alkenaryl or aralkenyl groups. Sizing compounds in which R' contains more than 12 and particularly 14 to 21 carbon atoms are preferred as well as those having an alkenyl group.

Representative of those cyclic dicarboxylic acid anhydrides which are broadly included within the above formula are sizing agents exemplified in U.S. Pat. Nos. 3,102,064; 3,821,069, and 3,968,005 as well as by Japanese Patent No. 959,923 and Sho-59-144697.

Thus, the substituted cyclic dicarboxylic acid anhydrides may be the substituted succinic and glutaric acid anhydrides of the above described formula including, for example, iso-hexadecenyl succinic acid anhydride, dodecenyl succinic acid anhydride, dodecyl succinic acid anhydride, decenyl succinic acid anhydride, octenyl succinic acid anhydride, triisobutenyl succinic acid anhydride, etc.

The sizing agents may also be those of the above described formula which are prepared employing an internal olefin corresponding to the following general structure:

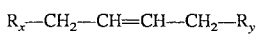

wherein $R_x$ is an alkyl radical containing at least four carbon atoms and $R_y$ is an alkyl radical containing at least four carbon atoms and which correspond to the more specific formula:

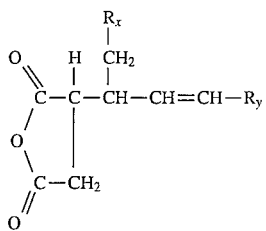

wherein $R_x$ is an alkyl radical containing at least 4 carbon atoms and $R_y$ is an alkyl radical containing at least 4 carbon atoms, and $R_x$ and $R_y$ are interchangeable. Specific examples of the latter sizing compounds include (1-octyl-2-decenyl) succinic acid anhydride and (1-hexyl-2-octenyl)succinic acid anhydride.

The sizing agents may also be prepared employing a vinylidene olefin corresponding to the following general structure:

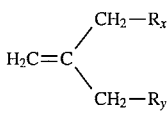

wherein $R_x$ and $R_y$ are alkyl radicals containing at least 4 carbon atoms in each radical. These compounds correspond to the specific formula:

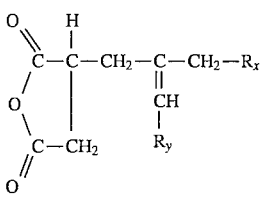

wherein $R_x$ is an alkyl radical containing at least 4 carbon atoms and $R_y$ is an alkyl radical containing at least 4 carbon atoms and $R_x$ and $R_y$ are interchangeable and are represented by 2-n-hexyl-1-octene, 2-n-octyl-1-dodecene, 2-n-octyl-1-decene, 2-n-dodecyl-1-octene, 2-n-octyl-1-octene, 2-n-octyl-1-nonene, 2-n-hexyl-1-decene and 2-n-heptyl-1-octene.

The sizing agents may also include those as described above prepared employing an olefin having an alkyl branch on one of the unsaturated carbon atoms or on the carbon atoms contiguous to the unsaturated carbon atoms. Representative of the later agents are n-octene-1; n-dodecene-1; n-octadecene-9; nohexene-1; 7,8-dimethyl tetradecene-6; 2,2,4,6,6,8,8-heptamethylnonene-4; 2,2,4,6,6,8,8-heptamethylnonene-3; 2,4,9,11 -tetramethyl-5-ethyldodecene° 5; 6,7-dimethyldodecene-6; 5-ethyl-6-methylundecene-5; 5,6-diethyldecene-5; 8-methyltridecene-6; 5-ethyldodecene-6; and 6,7-dimethyldodecene-4.

The cationic, non-degraded starches which are used herein are those further modified with either an ether group or an ester group. This modification with either ether group will be to an amount sufficient to provide a DS (degree of substitution) of from about 0.005 to 0.4 and preferably from about 0.02 to 0.085. The term "degree of substitution" (DS) as used herein indicates the average number of sites per anhydroglucose unit of the starch molecule on which there are substituent groups.

The modification of starch with an ether group involves formation of an etherified starch compound having the formula:

where ST represents the starch base material and R is an hydroxyalkyl or alkyl of 1 to 4 carbons, or an alkenyl of 2 to 4 carbons. Preferably the R group is an hydroxyalkyl of 2 to 3 carbon atoms. These starch ethers may be prepared by reaction with alkylene oxides and its precursor halohydrins, alkyl halides, and alkenyl halides. Etherification with alkylene oxides are preferred. Ethylene oxide, propylene oxide and butylene oxide are compounds useful in etherifying the starch materials. Other compounds such as modified alkylene oxides, e.g., allyl glycidyl ether, may be used to prepare useful starch ethers. Aryl compounds such as benzyl halide may also be used in the modification but are less preferable. Varying amounts of such compounds may be used depending on the final DS desired, as noted previously.

The ester modification involves formation of an esterified starch compound having the formula:

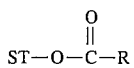

where ST represents the starch base material and R is an alkyl of 1 to 4 carbon atoms or alkenyl group of 2 to 4 carbon atoms and preferably alkyl of 1 to 2 carbon atoms. Starch esters of this type include starch acetate, starch propionate and starch butyrate. The starch esters are typically prepared by reacting starch with organic acid anhydrides such as acetic anhydride.

The modifications of starch to prepare the ethers and esters are well known in the art and a good review of such preparations may be found in R. L. Whistler, J. N. BeMiller and E. F. Paschall "Starch: Chemistry and Technology", Academic Press; 1984, Chapter X.

The starches used in this invention besides being modified with ether or ester groups are also cationically modified. Cationization of the starch can be produced by well known chemical reactions with reagents containing amino, imino, ammonium, sulfonium or phosphonium groups as disclosed, for example, in "Cationic Starches", by D. B. Solarek, in *Modified Starches: Properties and Uses*, Chapter 8, 1986, and in U.S. Pat. No. 4,119,487 issued Oct. 10, 1978 to M. Tessler. Such cationic derivatives include those containing nitrogen containing groups comprising primary, secondary, tertiary and quaternary amines and sulfonium and phosphonium groups attached through either ether or ester linkages. The preferred derivatives are those containing the tertiary amino and quaternary ammonium ether groups.

The general method for preparing starches containing tertiary amine groups, which method involves reacting starch under alkaline conditions with a dialkylaminoalkyl halide is described in U.S. Pat. No. 2,813,093 issued on Nov. 12, 1957 to C. Caldwell, et al. Another method therefore is disclosed in U.S. Pat. No. 4,675,394 issued Jan. 23, 1987 to D. Solarek, et al. The primary and secondary amine starches may be prepared by reacting the starch with aminoalkyl anhydrides, amino epoxides or halides, or the corresponding compounds containing aryl in addition to the alkyl groups.

Quaternary ammonium groups may be introduced into the starch by suitable treatment of the tertiary aminoalkyl ether of starch, as described in the previously noted U.S. Pat. No. 2,813,093. Alternatively, quaternary groups may be introduced directly into the starch by treatment with the reaction product of an epihalohydrin and a tertiary amine or tertiary amine salt, to provide, for example, 2-hydroxypropyl ether substituent groups as disclosed in the noted U.S. Pat. No. 4,119,487. The above noted patents, i.e., '487, '093 and '394 are incorporated herein by reference.

The preparation of cationic sulfonium derivatives is described in U.S. Pat. No. 2,989,520 issued June, 1961 to M. Rutenberg, et al. and essentially involves the reaction of starch in an aqueous alkaline medium with a beta-halogenoalkylsulfonium salt, vinylsulfonium salt or epoxyalkylsulfonium salt. The preparation of cationic phosphonium derivatives is disclosed in U.S. Pat. No. 3,077,469 issued Feb. 12, 1963 to A. Aszalos and involves reaction of starch in an aqueous alkaline medium with a beta-halogenoalkylphosphonium salt.

Other suitable cationic starches may be provided using reagents and methods that are well known in the art as illustrated in the above noted references. Further description of useful cationic starches are disclosed in U.S. Pat. No. 2,876,217 issued Mar. 3, 1959 to E. Paschall, U.S. Pat. No. 2,970,140 issued Jan. 31, 1961 to C. Hullinger, et al., U.S. Pat. No. 5,004,808 issued Apr. 2, 1991 to M. Yalpani, et al., U.S. Pat. No. 5,093,159 issued Mar. 3, 1992 to J. Fernandez, et al. and U.S. Pat. No. 5,227,481 issued Jul. 13, 1993 to J. Tsai et al., all of which are incorporated herein by reference. Particularly useful cationic derivatives are those containing amino or nitrogen groups having alkyl, aryl, alkaryl, aralkyl or cyclic substitutents of up to 18 carbon atoms and especially alkyl of 1 to 6 carbon atoms.

The amount of cationic substituent on the starch can be varied and generally a degree of substitution (DS) of from about 0.005 to 0.2 and preferably from about 0.01 to 0.05 will be used. While larger amounts of cationic substituents or higher degrees of substitution (DS) could be used, they are more costly and difficult to make and therefore not economically attractive.

The sequence of starch modification can be cationic first and then ether or ester, or it can be in the reverse order. However, in the case of ester modification, it is preferred to add the cationic group first. The process of modification can be performed in separate steps or in a continuous manner without separation of the intermediate starch derivatives. In any of these modifications, the starch can be in the granular state or in a dispersion utilizing aqueous or organic solvent solution.

The base starch material used in preparing the cationic and modified starches may be any of the native starches and more particularly the amylose containing starches, i.e., starches having at least 5% amylose content. Such starches include those derived from plant sources such as corn, potato, wheat, rice, tapioca, waxy maize, sago, sorghum and high amylose starch such as high amylose corn, i.e., starch having at least 45% amylose content. Starch flours may also be used. Especially useful starches are the amylose containing starches and particularly corn, potato and tapioca starch.

While any native starch may be used in this invention, it is important that the starch is largely or essentially non-degraded to provide better retention of the sizing emulsion in the paper system. More particularly the starch used in this invention is non-degraded and has a viscosity of at least 1,000 cPs at 30° C. in an 8% aqueous solution. Typically starches used in this invention will have a viscosity of from 1,000 to 100,000 cPs and preferably from 5,000 to 20,000 cPs at 30° C. in an 8% aqueous solution. This viscosity is that of the starch after complete or full modification, i.e., the final starch product, which is modified with the cationic group as well as the ether or ester group. The viscosity as used herein is a Brookfield viscosity measured using a Brookfield viscometer model no. DV-II with spindle no. 5 and 6 at 20 rpm.

The size composition or mixture of this invention comprises from about 0.1 to 10 and preferably from about 0.5 to 5 parts by weight of modified cationic starch per part of substituted cyclic dicarboxylic acid anhydride. This composition can be emulsified using many known emulsification procedures and systems including industrial size, low and high pressure units such as Cytec low pressure turbine emulsifiers manufactured by Cytec Inc, Nalco emulsified systems and National Starch turbine and venturi emulsifiers.

The sizing emulsion will contain the modified starch and sizing compound in a sufficient quantity of water to provide the desired concentration of the sizing compound. Thus, the amount of the sizing compound, i.e., the substituted cyclic dicarboxylic acid anhydride, in the emulsion will be sufficient if it is at a concentration of from about 0.1 to 50% and preferably 1 to 20% by weight.

The thus prepared emulsion can simply be added to the wet end of the paper making machine or to the stock preparation system so as to provide a concentration of the sizing agent of from about 0.01 to 2% and preferably about 0.1 to 0.5% by weight, based on dry fiber weight. Within the mentioned range, the precise amount of size which is to be used will depend for the most part upon the type of pulp which is being treated, the specific operating conditions, as well as the particular end use for which the paper product is destined. For example, paper which will require good water resistance or ink holdout will necessitate the use of a higher concentration of size than paper which will be used in applications where these properties are not critical.

Alternatively, the size emulsion may be sprayed or coated onto the surface of the formed web at any point prior to the drying step in the concentrations as prepared so as to provide the required size concentration.

The size emulsions are not limited to any particular pH range and may be used in the treatment of neutral and alkaline pulp, as well as acidic pulp. The size emulsions may thus be used in combination with alum, which is very commonly used in making paper, as well as other acid materials. Conversely, they may also be used with calcium carbonate or other alkaline materials in the stock.

Subsequent to the addition of the size emulsion, the web is formed and dried on the paper making machine in the usual manner. In actual paper machine operations, full sizing is generally achieved immediately off the paper machine.

Because of limited drying in laboratory procedures however, further improvements in the water resistance of the paper prepared with the size compositions of this invention may be obtained by curing the resulting webs, sheets, or molded products. The post-curing process generally involves heating the paper at temperatures in the range of from about 80° to 150° C. for a period of from about 1 to 60 minutes.

The size emulsions of the present invention may be successfully utilized for the sizing of paper and paperboard prepared from all types of both cellulosic and combinations of cellulosic with non-cellulosic fiber. Also included are sheet-like masses and molded products prepared from combinations of cellulosic and non-cellulosic materials derived from synthetics such as polyamide, polyester and polyacrylic resin fibers as well as from mineral fibers such as asbestos and glass. The hardwood or softwood cellulosic fibers which may be used include bleached and unbleached sulfate (Kraft), bleached and unbleached sulfite, bleached and unbleached soda, neutral sulfite, semi-chemical, groundwood, chemi-groundwood, and any combination of these fibers. In addition, synthetic cellulosic fibers of the viscose rayon or regenerated cellulose type can also be used, as well as recycled waste papers from various sources.

All types of pigments and fillers may be added in the usual manner to the paper product which is to be sized. Such materials include clay, talc, titanium dioxide, calcium carbonate, calcium sulfate and diatomaceous earths. Stock additives, such as defoamers, pitch dispersants, slimicides, etc. as well as other sizing compounds, can also be used with the size mixtures described herein.

As noted above, the size compositions described herein, when emulsified and used in the paper stock system, yield paper products having superior sizing properties. The following examples will further illustrate the embodiments of the present invention. In these examples, all parts given are by weight unless otherwise specified.

EXAMPLE 1

This example illustrates the use of a size composition representative of the sizes of this invention utilized in the form of an aqueous emulsion. This emulsion is compared in terms of particle size and size performance (Hercules Size Performance Test, HST) of the resulting sized paper, with a conventional emulsion made with a mixture of substituted cyclic dicarboxylic acid anhydride and a cationic corn starch.

A cationic corn starch was prepared in the following manner. Corn starch, 100 parts, was slurried in 150 parts water and 0.8 parts sodium hydroxide added as a 3% solution. The slurry was heated to 40° to 45° C. and 5 parts of (3-chloro-2-hydroxypropyl)trimethyl ammonium chloride added as a 65% aqueous solution with simultaneous addition of approximately 3.5 parts sodium hydroxide as a 3% solution to maintain a pH of 11.5. After 12 to 16 hours reaction at 40° to 45° C., the slurry is neutralized to pH of 6.0 with dilute hydrochloric acid (3:1). The starch was recovered by filtration, washed twice with water and dried. The product had a nitrogen content of 0.30% by weight on a dry basis (db).

The cationic corn starch, prepared as described above, was then further modified with 4% acetic anhydride in the following manner. One hundred (100) parts of cationic corn starch was slurried in 125 parts water and the pH adjusted to 8.0 by the addition of dilute sodium hydroxide (3%). Four (4) parts of acetic anhydride was added slowly to the agitated starch slurry with the pH maintained at 8.0 to 8.25 by the metered addition of dilute sodium hydroxide. After the reaction was complete, the pH was adjusted to 5.5 with dilute hydrochloric acid (3:1). The starch product was recovered by filtration, washed three times with water and air dried. The starch product had an acetyl content of 0.061 DS as determined by proton NMR spectral analysis.

A size composition was prepared by combining 1 part of acetyl modified cationic corn starch, prepared as described above with 1 part of alkenyl substituted succinic acid anhydride wherein the alkenyl groups contained 15 to 20 carbon atoms (hereinafter referred to as ASA). The modified starch had a Brookfield viscosity of 36,600 cPs. An emulsion was prepared using a low pressure turbine emulsifier (Cytec Inc.). Additional modified cationic starch with 2 and 6% acetic anhydride were also prepared and formed into emulsions in a similar manner.

Calculated amounts of the emulsions prepared as described above were added to aqueous slurries of bleached sulfate pulp having a Williams freeness of 400 cc, a consistency of 0.5% and a pH of about 8.0, so as to yield a concentration of ASA in dry fiber weight of about 0.15%. Sheets were formed in accordance with TAPPI standards, dried on a rotary print drier (surface temperature approximately 90° C.) then cured for 1 hour at 105° C. and conditioned overnight at 72° F. and 50% relative humidity (RH) before testing.

The Hercules Size Performance Test (HST) was employed to compare the ink resistance of the sheets prepared. The test comprises applying an amount of acid ink (pH 2.3) to the upper paper surface and with the use of a photoelectric cell, the underside of the paper is monitored for reflectance. The time it takes for the ink to cause a decrease in reflectance from 100% to 80% is the paper's HST time. The HST of the paper is a measure of the sizing performance of a given size. The longer the HST time, the better the size is.

The average particle size (APS) was measured using a Horiba LA-900 particle size analyzer.

Table 1 presents the sizing performance data (HST in seconds) and the average particle size (APS in microns). All starches had the same quaternary ammonium cationic group made with 3-chloro-2-hydroxypropyltrimethyl ammonium chloride to a nitrogen content of 0.30% (db) as described above. All viscosities were Brookfield viscosity measured at 30° C. in an 8% aqueous solution.

TABLE 1

| Starch | DS[1] | Brookfield Viscosity (cPs) | Size (Amt. lb/T) | HST (sec) | Particle Size (μ) |
|---|---|---|---|---|---|
| Cationic Corn Control | 0 | 3,810 | ASA (3) | 22 | 0.779 |
|  |  |  | (5) | 100 | 0.779 |
| Cationic Corn (2% Acetic Anhydride) | 0.031 | 18,300 | ASA (3) | 34 | 0.759 |
|  |  |  | (5) | 196 | 0.759 |
| Cationic Corn (4% acetic anhydride) | 0.061 | 36,600 | ASA (3) | 63 | 0.716 |
|  |  |  | (5) | 284 | 0.716 |
| Cationic Corn (6% acetic anhydride) | 0.092 | 42,200 | ASA (3) | 52 | 0.695 |
|  |  |  | (5) | 285 | 0.695 |

[1]Acetic anhydride modification

The results shown above indicate that the size composition of this invention, using the selected cationic, non-degraded starch modified with an ester group (acetyl) in combination with a dicarboxylic acid anhydride sizing agent, improves the quality of the emulsion as reflected by reduced particle size and further provides improved sizing efficiency as reflected by increased HST values.

EXAMPLE 2

This example illustrates additional sizing compositions prepared and tested in the same manner as the sizing of Example 1 using a propylene oxide modified cationic corn starch.

Cationic corn starch having a nitrogen content of 0.3%, was prepared in the same manner as in Example 1. In a sealed container, one hundred (100) parts of the cationic corn starch was slurried in 150 parts water in which 30 parts sodium sulfate is dissolved and 1.5 parts of sodium hydroxide was added as a 3% solution. The slurry was then heated to 40 to 45° C., 4 parts of propylene oxide added to the starch slurry and the slurry agitated at 40 to 45° C. for 12 to 16 hours. The slurry was cooled to 25° C. and neutralized to 3.0–3.5 pH with dilute hydrochloric acid. After 1 hour, the starch slurry was adjusted to 5.5 pH with sodium hydroxide (3% solution). The starch product was recovered by filtration, washed three times with water and air dried. Hydroxypropyl substitution levels were determined by proton NMR spectral analysis to be 0.098 DS.

An emulsion of the propylene oxide modified cationic corn starch, prepared as described above with ASA was formed in a similar manner to that described in Example 1. Additional modified cationic corn starch with 2 and 6% propylene oxide were also prepared and formed into emulsions in a similar manner.

Table 2 presents the sizing performance data and the average particle size for the different sizing compositions.

TABLE 2

| Starch | DS[2] | Brookfield Viscosity (cPs) | Size (Amt lb/T) | HST (sec) | Particle Size (μ) |
|---|---|---|---|---|---|
| Cationic Corn Control | 0 | 3,810 | ASA (3) | 48 | 1.012 |
|  |  |  | (5) | 233 | 1.012 |
| Cationic Corn (2% propylene oxide) | 0.047 | 10,200 | ASA (3) | 63 | 0.906 |
|  |  |  | (5) | 296 | 0.906 |
| Cationic Corn (4% propylene oxide) | 0.098 | 22,300 | ASA (3) | 88 | 0.965 |
|  |  |  | (5) | 330 | 0.965 |
| Cationic Corn (6% propylene oxide) | 0.147 | 38,950 | ASA (3) | 81 | 0.927 |
|  |  |  | (5) | 220 | 0.927 |

[2]Propylene oxide modification

The results shown in Table 2 indicate the improved emulsion quality (reduced particle size) and improved sizing efficiency (HST) that resulted when using the size composition of this invention containing the selected cationic, non-degraded starch modified with an ether group (hydroxypropyl) and ASA.

EXAMPLE 3

Other propylene oxide modified cationic starches using potato and tapioca starch were prepared and formed into sizing emulsion as described above in Examples 1 and 2. The cationic potato starch had nitrogen content of 0.29% and cationic tapioca starch had nitrogen content of 0.28% (db).

The results shown below in Table 3 indicate similar improved emulsion quality and sizing as illustrated in the previous examples.

TABLE 3

| Starch | DS[2] | Brookfield Viscosity (cPs) | Size (Amt lb/T) | HST (sec) | Particle Size (μ) |
|---|---|---|---|---|---|
| Cationic Potato Control | 0 | 2,340 | ASA (3) | 66 | 0.992 |
|  |  |  | (5) | 213 | 0.992 |
| Cationic Potato (4% propylene oxide) | 0.107 | 2,800 | ASA (3) | 79 | 0.797 |
|  |  |  | (5) | 374 | 0.797 |
| Cationic Tapioca Control | 0 | 2,490 | ASA (3) | 54 | 0.779 |
|  |  |  | (5) | 243 | 0.779 |
| Cationic Tapioca (4% propylene oxide) | 0.107 | 2,900 | ASA (3) | 73 | 0.827 |
|  |  |  | (5) | 353 | 0.827 |

[2]Propylene oxide modification

What is claimed is:

1. A method for sizing paper products comprising the steps of:
   a) providing a paper stock system;
   b) forming a sizing emulsion comprising a cyclic dicarboxylic acid anhydride containing hydrophobic substitution, a cationic, non-degraded starch which is further modified to a DS of from about 0.005 to 0.4 with either:
      i) an ether group, R—O— where R is an hydroxyalkyl or alkyl of 1 to 4 carbon atoms or alkenyl of 2 to 4 carbon atoms, or
      ii) an ester group,

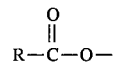

where R is an alkyl of 1 to 4 carbon atoms or alkenyl of 2 to 4 carbon atoms, wherein the non-degraded, fully modified starch has a viscosity of at least 1,000 cPs at 30° C. in an 8% aqueous solution and there is from about 0.1 to 10 parts by weight of modified cationic starch per part of substituted cyclic dicarboxylic acid anhydride, and water;
   c) forming a web from the paper stock system; and
   d) dispersing said emulsion within the paper stock either before or after formation of said web but prior to passing said web through the drying stage of the paper making operation in an amount sufficient to provide a concentration of the substituted cyclic dicarboxylic acid anhydride of from about 0.01 to 2.0% by weight, based on dry fiber weight.

2. The method of claim 1 wherein the starch is an amylose containing starch having at least 5% amylose content.

3. The method of claim 1 wherein the sizing emulsion is formed prior to introduction into the paper stock system.

4. The method of claim 1 wherein the cyclic dicarboxylic acid anhydride is represented by the formula:

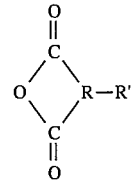

wherein R represents a dimethylene or trimethylene radical and R' is a hydrophobic group containing more than 4 carbon atoms which may be selected from the class consisting of alkyl, alkenyl, aralkyl, alkaryl, alkenaryl and aralkenyl groups.

5. The method of claim 4 wherein the starch is an amylose containing starch having at least 5% amylose content and the fully modified starch has a viscosity of from 1,000 to 100,000 cPs at 30° C. in an 8% aqueous solution.

6. The method of claim 5 wherein about 0.5 to 5 parts of modified cationic starch per part of cyclic dicarboxylic acid anhydride is used, and the starch is further modified to a DS of from about 0.02 to 0.085.

7. The method of claim 6 wherein the R in the ether group is an hydroxyalkyl of 2 to 3 carbon atoms.

8. The method of claim 6 wherein the R in the ester group is an alkyl of 1 to 2 carbon atoms.

9. The method of claim 6 wherein the R' group in the cyclic dicarboxylic acid anhydride contains from 5 to 30 carbon atoms and the starch is corn, potato or tapioca starch.

10. The method of claim 9 wherein the R in the ether group is an hydroxyalkyl of 2 to 3 carbon atoms and the R in the ester group is an alkyl of 1 to 2 carbon atoms.

11. The method of claim 10 wherein the starch is cationized with a tertiary amino or quaternary ammonium ether group.

12. The method of claim 5 wherein the R' in the substituted cyclic dicarboxylic acid anhydride is an alkenyl group, R in the ether group is hydroxyalkyl of 2 to 3 carbon atoms, and the R in the ester group is an alkyl of 1 to 2 carbon atoms.

13. The method of claim 12 wherein the starch is cationized with a tertiary amino or quaternary ammonium ether group.

14. Paper or paperboard made by the method of claim 1.

15. Paper or paperboard made by the method of claim 10.

\* \* \* \* \*